United States Patent [19]
Gasser

[11] Patent Number: 5,275,537
[45] Date of Patent: Jan. 4, 1994

[54] MAGNETIC POWER PISTON FLUID COMPRESSOR

[75] Inventor: Max G. Gasser, Bethesda, Md.

[73] Assignee: The United States of America as represented by the Administrator of the National Aeronautics and Space Administration, Washington, D.C.

[21] Appl. No.: 24,971

[22] Filed: Mar. 2, 1993

[51] Int. Cl.⁵ ............................................. F04B 37/00
[52] U.S. Cl. ........................................ 417/48; 417/50
[58] Field of Search .................... 417/48, 50, 322, 572

[56] References Cited

U.S. PATENT DOCUMENTS

| | | | |
|---|---|---|---|
| 2,786,416 | 3/1957 | Fenemore | 417/50 |
| 3,219,851 | 11/1965 | Kidwell | 417/50 |
| 3,778,678 | 12/1973 | Masuda | 417/48 |
| 4,917,579 | 4/1990 | Torma | 417/322 |
| 5,129,789 | 7/1992 | Thornton et al. | 417/322 |
| 5,192,197 | 3/1993 | Culp | 417/322 |

FOREIGN PATENT DOCUMENTS 1590650  9/1990  U.S.S.R. ............................ 417/322
779656  11/1990  U.S.S.R. ............................ 417/50

Primary Examiner—Richard E. Gluck
Assistant Examiner—Roland G. McAndrews, Jr.
Attorney, Agent, or Firm—Paul S. Clohan, Jr.; R. Dennis Marchant; Guy M. Miller

[57] ABSTRACT

A compressor with no moving parts in the traditional sense having a housing having an inlet end allowing a low pressure fluid to enter and an outlet end allowing a high pressure fluid to exit. Within the compressor housing is at least one compression stage to increase the pressure of the fluid within the housing. The compression stage has a quantity of magnetic powder within the housing, is supported by a screen that allows passage of the fluid, and a coil for selectively providing a magnetic field across the magnetic powder such that when the magnetic field is not present the individual particles of the powder are separated allowing the fluid to flow through the powder and when the magnetic field is present the individual particles of the powder pack together causing the powder mass to expand preventing the fluid from flowing through the powder and causing a pressure pulse to compress the fluid.

12 Claims, 5 Drawing Sheets

MAGNETIC POWER PISTON FLUID COMPRESSOR

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates to fluid compressors in general and to a fluid compressor that has no moving internal parts in the traditional sense within the compressor unit.

BACKGROUND ART

Compressors are used to increase the pressure of a wide variety of gases and vapors for a multitude of purposes. A common application is the air compressor used to supply high-pressure air for conveying, paint spraying, tire inflating, cleaning, pneumatic tools, and rock drills. The refrigeration compressor is used to compress the gas formed in the evaporator. Other applications of compressors include chemical processing, gas transmission, gas turbines and construction.

Compressors can be classified as reciprocating, rotary, jet, centrifugal, or axial-flow, depending on the mechanical means used to produce compression of the fluid, or as positive-displacement or dynamic-type, depending on how the mechanical elements act on the fluid to be compressed. Positive displacement compressors confine successive volumes of fluid within a closed space in which the pressure of the fluid is increased as the volume of the closed space is decreased. Dynamic-type compressors use rotating vanes or impellers to impart velocity and pressure to the fluid.

New compressors under development include an oilless compressor for Joule-Thompson cryocoolers. Existing high-pressure compressors use oil as a lubricant and to remove heat, but the result is a waste-effluent problem and possible contamination that could clog the Joule-Thompson restrictor. Also under development is a magneto hydrodynamic compressor. The gas is compressed by a liquid gallium slug reciprocating in a narrow gap between the poles of a permanent magnet. An alternating current is fed through the gallium slug in a direction perpendicular to the magnetic field. The interaction between the current and the magnetic field generates a force on the slug normal to the plane formed by the current and field vectors. This force is aligned with the axis of the channel and causes the slug to reciprocate back and forth at the same frequency as the input current. The motion of the liquid gallium slug is used to compress the gas. Intake and discharge ducts are connected through check valves to both ends of the compressor channel. The purported advantages of the liquid gallium compressor are no contamination of the working fluid, high reliability, good efficiency, high pressure ratio capability, ease of vibration cancellation and small size and weight.

A new type of refrigerator compressor under development is a compressor that uses resonant sound waves. In a conventional refrigerator compressor, an oil-lubricated piston-and-cylinder device mechanically compresses refrigerant gas to produce cooling. In this new compressor, an acoustic drive, which functions somewhat like a bass loudspeaker, uses electrical power to set up resonant sound waves with pressure amplitudes up to 100 pounds per square inch. The sound waves then compress the refrigerant when they pass through a pair of high speed, 340-cycles-per-second, one way valves.

All of the above mentioned compressors have one serious drawback; they all contain moving parts, either pistons, valves, rotating vanes, etc. The present invention will go one step beyond the current compressor technology to eliminate moving parts in the traditional sense.

STATEMENT OF THE INVENTION

It is therefore an object of the present invention to provide a fluid compressor that has no moving parts in the traditional sense.

A further object of the invention is to provide a fluid compressor that is relatively easy to make in that there are no precision parts necessary in its manufacture.

A still further object of the invention is to provide a fluid compressor that will eliminate on-off cycles in refrigeration use.

These and other objects are achieved by providing a compressor with no moving parts in the traditional sense that has a housing having an inlet end allowing low pressure fluid to enter and an outlet end allowing a high pressure fluid to exit. Within the compressor housing is one or more compression stages to increase the pressure of the fluid within the housing. Each compression stage has a quantity of magnetic powder within the housing supported by a screen that allows passage of the fluid and a coil for selectively providing a magnetic field across the magnetic powder such that when the magnetic field is not present the individual particles of the powder are separated allowing the fluid to flow through the powder and when the magnetic field is present the individual particles of the powder pack together preventing the fluid from flowing through the powder and causing the powder to provide a pressure pulse to compress the fluid.

DETAILED DESCRIPTION OF THE INVENTION

Figure 1:
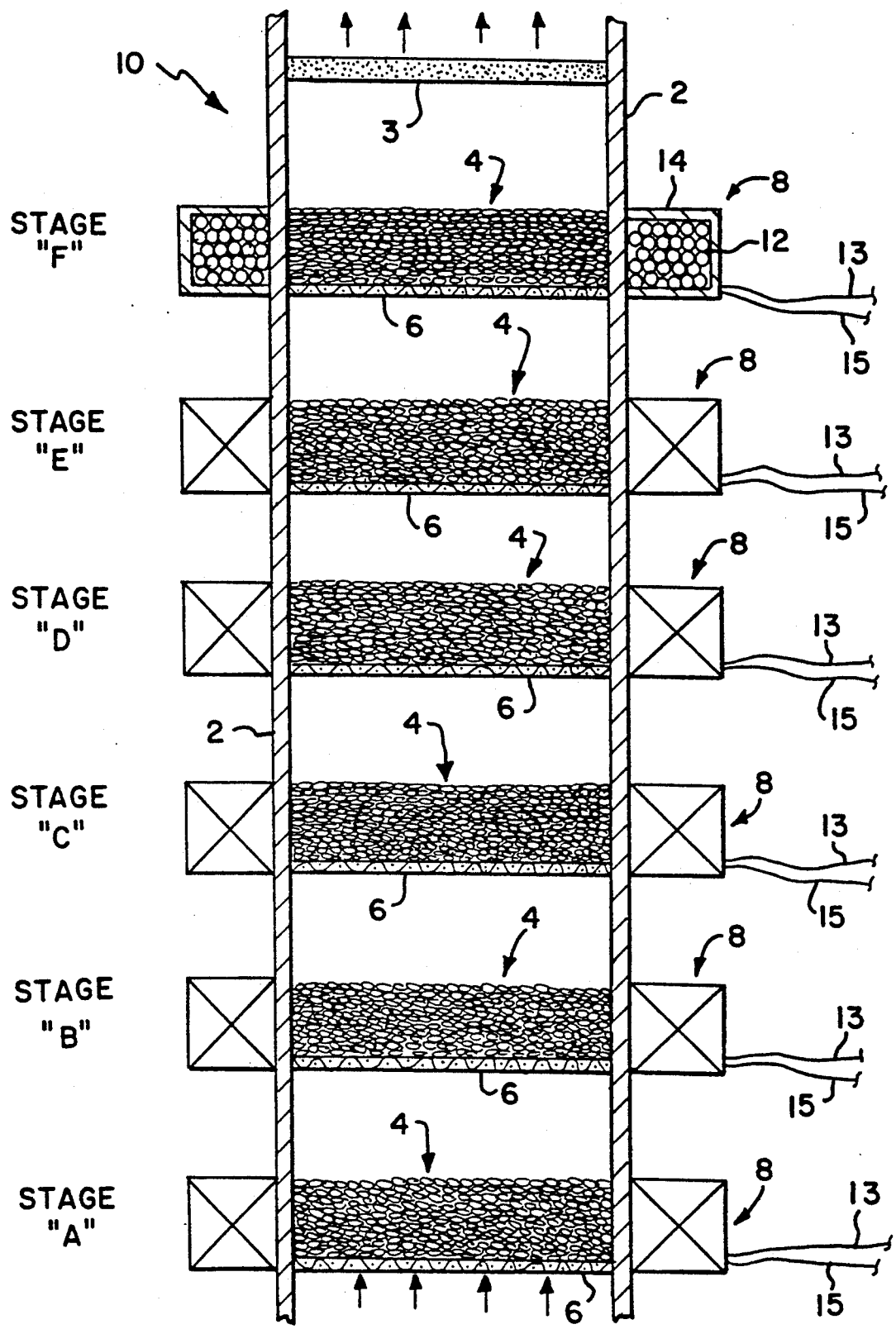
FIG. 1 is a cross-sectional view of a multi-stage compressor with no moving parts according to the present inventive concepts.

Referring now to FIG. 1, a cross-sectional view of a multi-stage compressor 10 with no moving parts is shown. In this particular embodiment, multi-stage compressor 10 has six stages, shown as stages "A" through "F". This particular quantity of stages is shown for illustration purposes only; compressor 10 with no moving parts can be assembled with any desired number of stages, from a single stage to any practical number of stages. Each stage "A" through "F" has a Coil 8 located on the exterior of housing 2. In this embodiment, housing 2 is cylindrical in shape, although this is not necessarily the limiting shape for housing for compressor 10. Thus each coil 8 rings housing 2 as shown and are toroidal in shape. Each coil 8 consists of a housing 14 within which are located a series of windings 12. A pair of wires 13 and 15 carry electrical current into and out of coils 12 in a standard well known manner.

Located within housing 2, at each stage "A" through "F" are "active elements" 4 of each stage. "Active element" 4 consists of a dry, very fine and free flowing magnetic (i.e., capable of being magnetized) powder, such as spherical stainless steel powder, ASTM Grade: 410; UNS Grade: S41000. "Active element" 4 must have a relatively small particle size (one particular experimental compressor uses a particle size of 38 microns), but larger and smaller size particle sizes are available and the particular size will depend upon the intended application, although it is desirable that the individual particles of the magnetized powder be approximately spherical. The large iron content (approx. 85%) accounts for its magnetic properties. Absent are reaction products such as oxides or nitrides because the spheres are formed in an inert gas atmosphere. The bed of each "active element" 4 is supported by screen 6, which can be any suitable screen having a very small mesh size that will allow fluid flow but prevent leakage of "active element" 4. A filter 3 is provided at the exit end to trap "active element" 4 particles that may become suspended in the fluid as it exits compressor 10.

Figure 2:
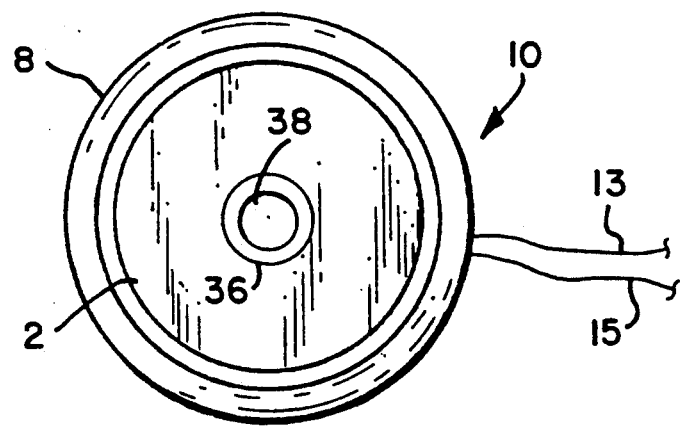
FIG. 2 is a top view of the housing of the compressor with no moving parts of FIG. 1.

FIG. 2 is a top view of housing 2 of compressor 10. In this view, it can be seen that coil 8 "rings" housing 2 in a toroidal fashion. Housing 2 also necks down to a smaller diameter outlet flange 16 having an aperture 18 allowing exit of the high pressure fluid. On the opposite side of aperture 18, low pressure fluid enters compressor 10 in a similar aperture prior to stage "A", is compressed by stages "A" through "F" and exits compressor 10 as a high pressure fluid through aperture 18.

Figure 6:
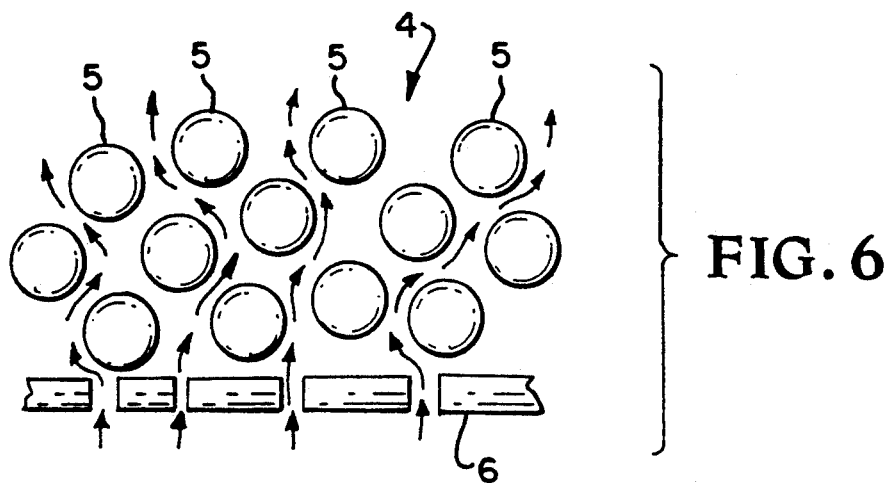
FIG. 6 depicts the configuration of the active elements of the compressor with no moving parts when they are not subject to a magnetic field.
Figure 7:
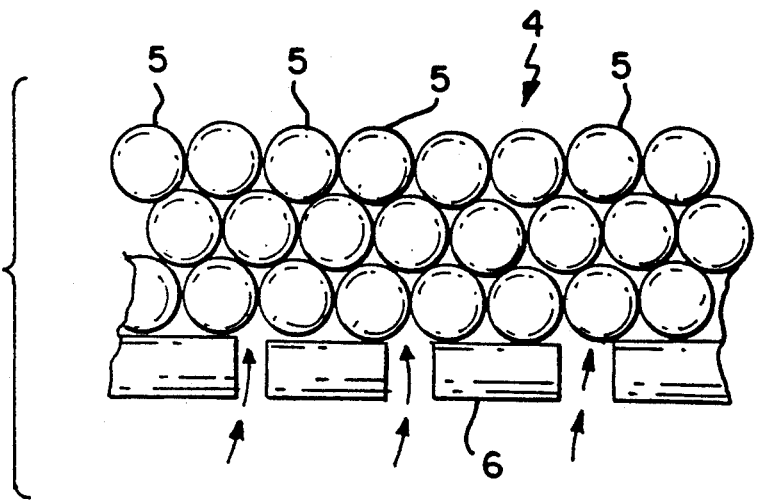
FIG. 7 depicts the configuration of the active elements of the compressor with no moving parts when they are subject to a magnetic field.

Each of the stages "A" through "F" provide compression of the fluid as follows: when windings 12 are unenergized (i.e., there is no electrical current flowing through the windings), the fluid within housing 2 is able to flow through the very fine and free flowing spherical powder of "active element" 4 in the manner of a fluidized bed. This condition is shown in FIG. 6 where the individual spherical elements of "active element" 4 are identified by reference numeral 5. As shown in this figure, there is sufficient space between individual spherical elements 5 to allow the fluid to flow through screen 6 and between spherical elements 5 towards the next "active element" bed. When coil 8 is energized, spherical elements 5 will pack together as shown in FIG. 7, due to the presence of a magnetic field across "active element" 4 preventing the fluid from flowing through "active element" 4. Thus, any fluid on the screen 6 side of "active element" 4 will be prevented from flowing through screen 6 and through "active element" 4 to the next "active element", and fluid that is above "active element" 4 will be captured on that side of the "active element", although there will be some leakage as this is a "clearance seal". Thus, energizing and de-energizing coil 8 allows "active element" 4 to act like a "valve".

Energizing coil 8, in addition to packing each individual spherical element 5 together, also causes "active element" 4 to expand upward or rise forming a pressure pulse. Because "active element" 4 is constrained on three sides by mesh 6 and housing 2, "active element" 4 will rise upwards towards an adjacent "active element" 4. This expansion upward of "active element" 4 allows "active element" 4 to act as a "piston" providing one stage of compression. "Active element" 4 thus performs two separate functions; that of a "valve" and that of a "piston". In this manner, each stage "A" through "F" of compressor 10 causes the compression of the fluid in a "rail gun" manner. By the time the fluid exits stage "F" it has been compressed from a low pressure to a high pressure fluid. The sequencing or pulsing of coils 8 can be controlled in any normal manner to achieve this "rail gun" effect.

Figure 3:
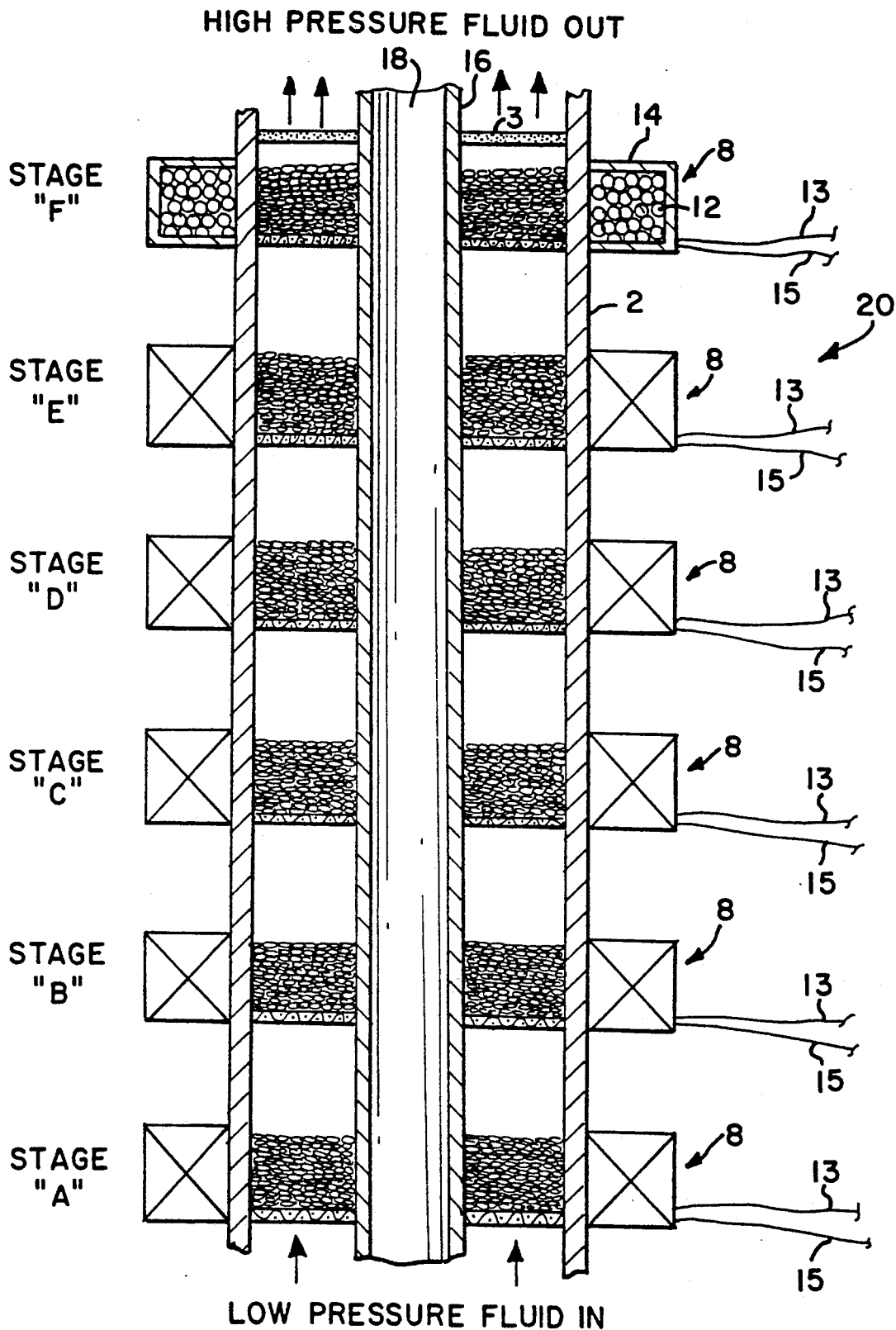
FIG. 3 is a cross-sectional view of an alternative embodiment of a multi-stage compressor with no moving parts according to the present inventive concepts.

Many different methods may be used to cool compressor 10, but one particular embodiment is shown in FIG. 3. In this embodiment, compressor 20 has a cooling tube 16 running down the middle of housing 2, and inside cooling tube 16 is a coolant 18 that can be delivered by another compressor 10 with no moving parts. Any suitable coolant may be used in this arrangement.

Figure 5:
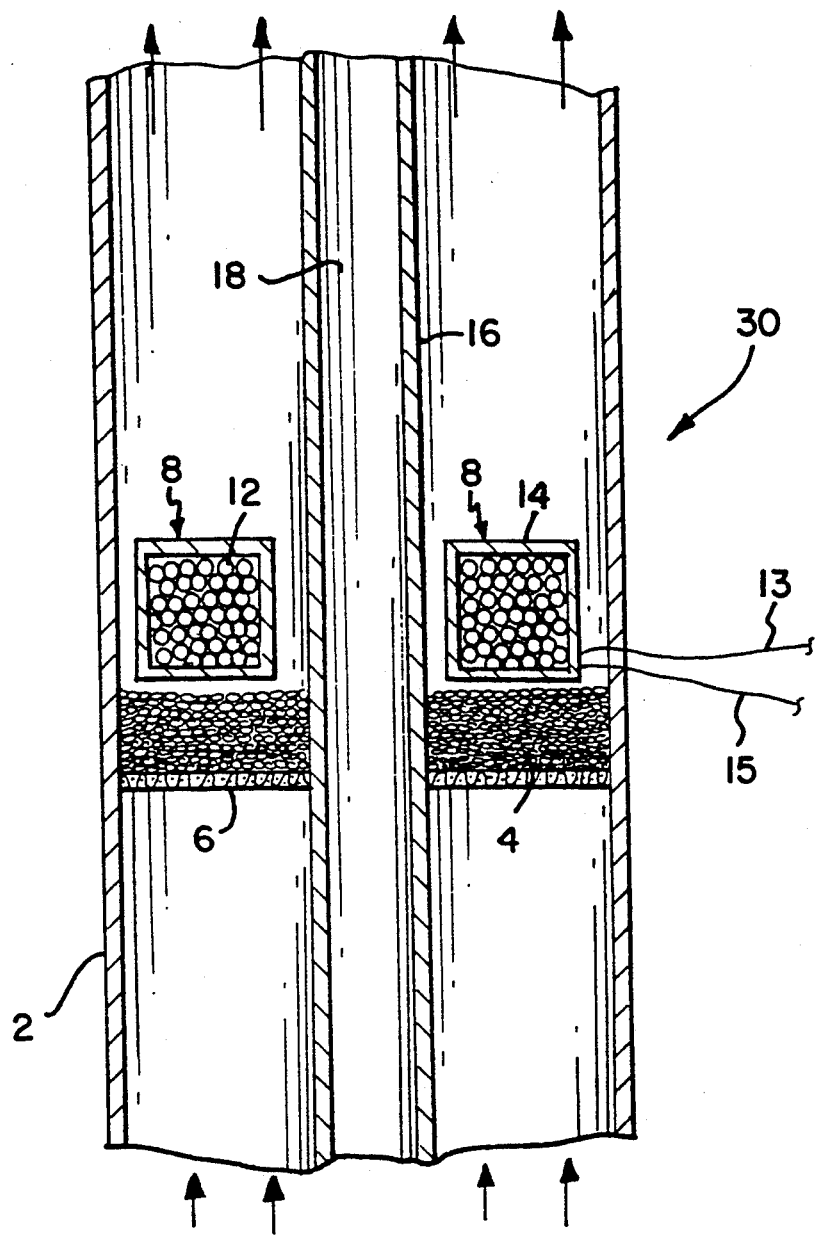
FIG. 5 is a cross-sectional view of another alternative embodiment of a compressor with no moving parts according to the present inventive concepts.

FIG. 5 is a cross-sectional view of another alternative embodiment of a compressor 30 with no moving parts according to the present inventive concepts. In this embodiment, coil 8 is inside housing 2 instead of on the outside as in the previously described embodiments. This embodiment may be useful if the size of the compressor needs to be reduced. Although one stage is shown, it is to be understood that numerous stages could be provided.

Figure 4:
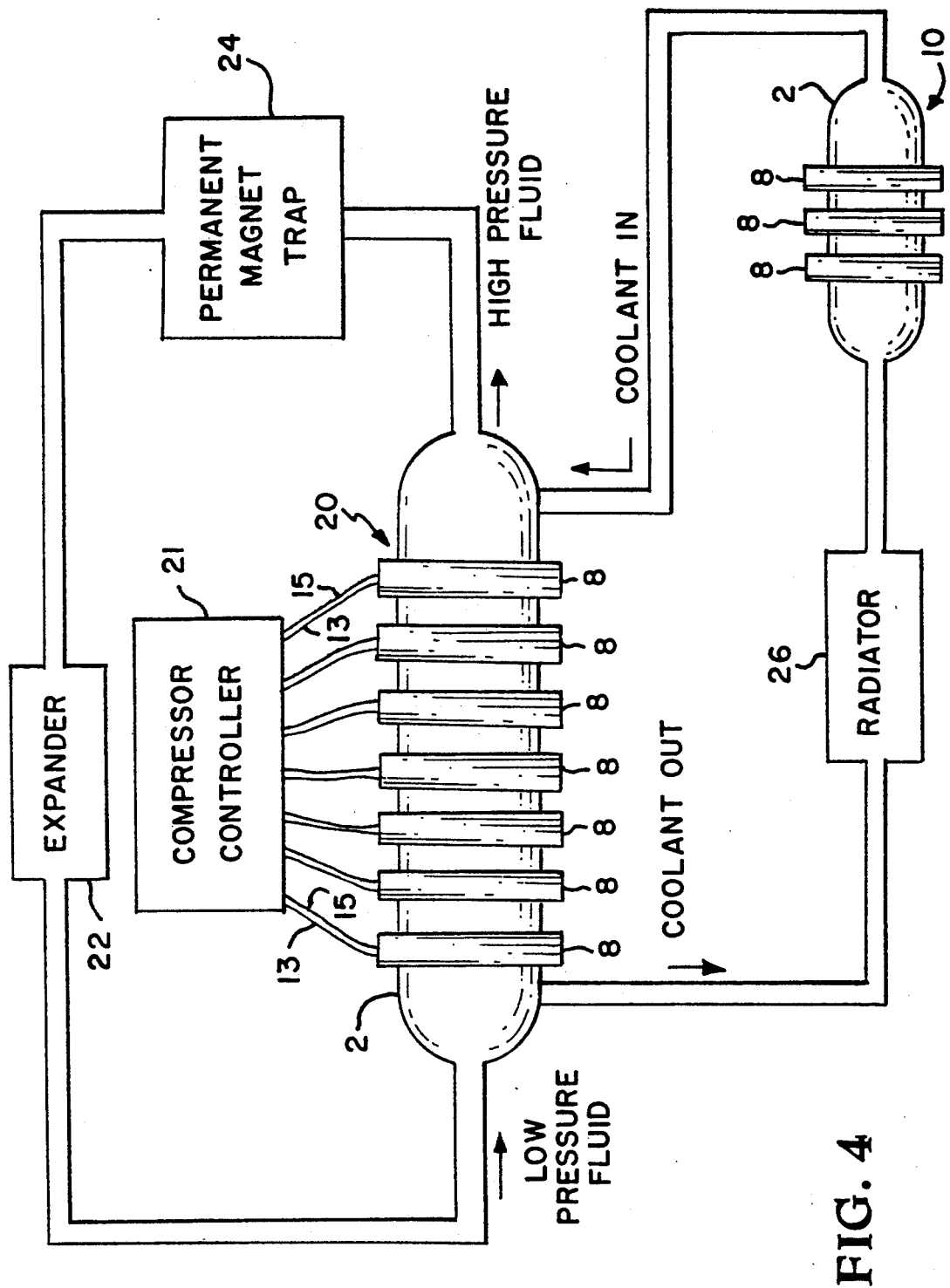
FIG. 4 is a schematic diagram of a closed loop refrigeration system incorporating a multi-stage compressor with no moving parts according to the present inventive concepts.

FIG. 4 shows how compressor 20 can be used in a closed loop refrigeration system. Coils 8 are controlled by a compressor controller 21, which can be a microprocessor or other suitable control means well understood in this art. Low pressure fluid enters compressor 20 as previously described, and exits as a high pressure fluid. Permanent magnet trap 24 is used to catch any of the spherical elements that are not trapped by filter 3. Expander 22 performs a standard refrigeration function. Coolant pump 10 pumps coolant into compressor 20 and the exiting hot coolant is allowed to radiate to atmosphere through radiator 26.

Under certain applications the spherical elements 5 can be lubricated to reduce friction and to fill the spaces between adjacent spherical elements. Union Carbide makes a new refrigerant lubricant called UCON 488 that is a polyalkylene glycol-based material that might be suitable. This would not apply to cryogenic applications were the lubricant vapor from outgassing would freeze at the cold end.

The advantage of the refrigeration system shown is that it can operate continuously thus eliminating the troublesome on-off cycling of current state of the art systems. This provides for lower overall energy use and the elimination of voltage/current spikes in the system.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A fluid compressor comprising:

a housing having an inlet end adapted to allow with fluid to enter and an outlet end adapted to allow said fluid to exit at a pressure higher than when entering said housing;

at least one compression stage adapted to said housing to increase the pressure of said fluid after entering said housing;

said compression stage comprising a quantity of magnetic powder within said housing, supported by an element allowing passage of said fluid, and a means for selectively providing a magnetic field across said powder such that when said magnetic field is not present the individual particles of said powder remain separated thereby allowing said fluid to flow through said powder and when said magnetic field is present the individual particles of said powder pack together causing said powder to expand and form a pressure pulse compressing said fluid.

2. The compressor of claim 1 wherein said magnetic powder is spherical in shape.

3. The compressor of claim 2 wherein said magnetic powder is a spherical stainless steel powder.

4. The compressor of claim 3 wherein said spherical stainless steel powder has a particle size of 38-100 microns, 5. The compressor of claim 1 wherein said element allowing passage of said fluid comprises a screen.

6. The compressor of claim 5 wherein said screen is a fine mesh screen having a mesh size adapted to said particle size.

7. The compressor of claim 1 wherein said means for selectively providing a magnetic field across said powder comprises a coil having a series of windings therein.

8. The compressor of claim 7 wherein said coil is located externally of said housing.

9. The compressor of claim 7 wherein said coil is located internally in said housing.

10. The compressor of claim 1 further comprising a cooling means located within said housing.

11. The compressor of claim 10 wherein said cooling means comprises a tube having a coolant therein.

12. The compressor of claim 11 wherein said tube is located in the center of said housing.

* * * * *